A. C. VAUGHAN.
DECOY.
APPLICATION FILED APR. 7, 1914.
1,110,245.
Patented Sept. 8, 1914.
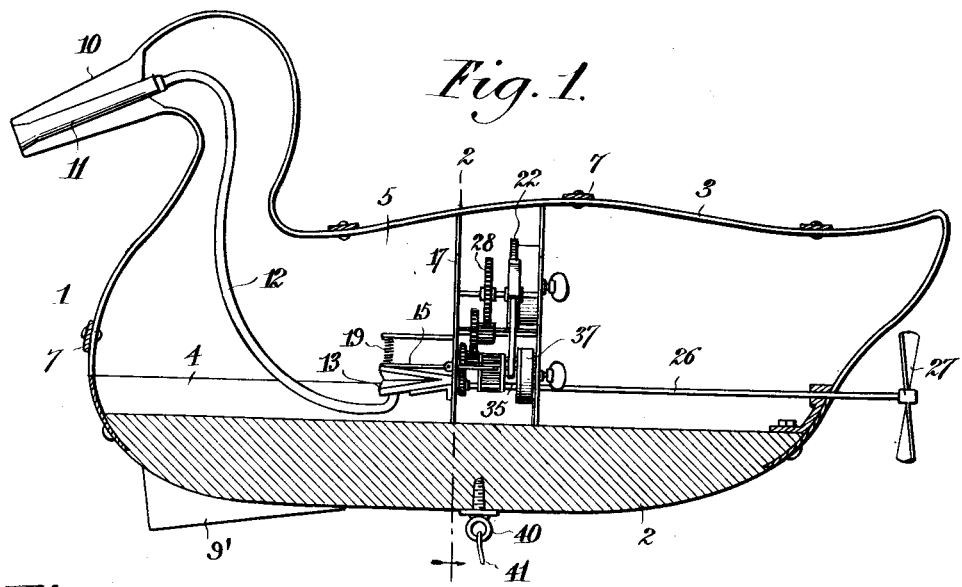
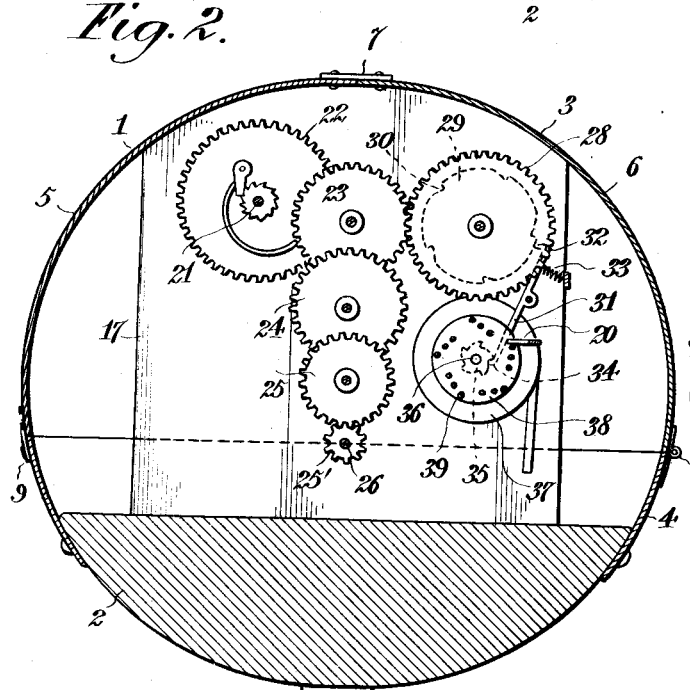
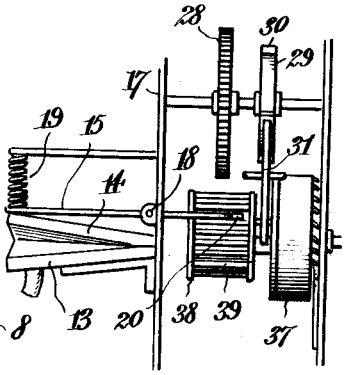
Witnesses:
C. Peinke Jr.
a. C. Hines
Inventor,
A. C. Vaughan,
By Victor J. Evans,
Attorney.

UNITED STATES PATENT OFFICE.

AMOS C. VAUGHAN, OF ANADARKO, OKLAHOMA.

DECOY.

1,110,245.  Specification of Letters Patent.  Patented Sept. 8, 1914.

Application filed April 7, 1914. Serial No. 830,228.

*To all whom it may concern:*

Be it known that I, AMOS C. VAUGHAN, a citizen of the United States, residing at Anadarko, in the county of Caddo and State of Oklahoma, have invented new and useful Improvements in Decoys, of which the following is a specification.

This invention relates to mechanical decoys, such as are made in the form of ducks, geese and other water fowl, adapted to give cries or calls in imitation of the natural fowl to serve as a lure whereby natural fowl are attracted.

The object of the invention is to provide a decoy of simple construction, which is desired to automatically give at predetermined intervals a call or cry, and which may also move about in the water to simulate the motions of natural fowl.

The invention consists of the features of construction, combination and arrangement of parts herein fully described and claimed, reference being had to the accompanying drawing in which:—

Figure 1 is a vertical longitudinal section of a decoy, in the form of a duck, embodying my invention. Fig. 2 is a vertical transverse section on the line 2—2 of Fig. 1. Fig. 3 is a detail view showing the means for operating the bellows of the pneumatic call mechanism.

Referring to the drawing, 1 designates the body of the decoy, which may be made in simulation of a duck, goose or other fowl or bird. This body is preferably hollow and composed of a bottom portion 2, composed of wood or other suitable material, and a top portion 3, composed of sheet metal, canvas or other suitable material. This portion 3 includes a lower section 4 secured to the bottom 2, and an upper section composed of divided portions 5 and 6 rigidly united by suitable connecting elements 7. The portion 3 is hinged or pivoted at one side to one of the sides of the portion 4, as shown at 8, and is adapted to be secured at its opposite or free side to the other side of the portion 4 by any suitable type of fastening means, generally indicated at 9, the construction being such as to provide a body having relatively hinged or pivoted bottom and top sections adapted to be opened and closed for convenience in assembling, cleaning and repairing the internal parts. The body is provided with an adjustable rudder 9', which may be set to guide the decoy to describe any desired circle upon the water.

Arranged within the mouth portion 10 of the body is a call or sounding device 15, with which communicates one end of a tube 6, through which a current of compressed air is adapted to be supplied to sound said sounding device, which tube is connected at its opposite end with an air supply device 13, which may consist of a bellows mechanism 13. This bellows mechanism 13 has a movable wall 14 connected to one end of an actuating lever 15 pivoted to the frame 17 of a clock work mechanism, as indicated at 18, a spring 19 acting on the lever to normally hold the bellows distended. The other end of the bellows is provided with a right angularly projecting trip finger 20 adapted to be operated at predetermined periods, as hereinafter described.

The clock work mechanism, which in general may be of any suitable construction, includes a winding shaft 21 and a primary drive gear 22 driven therefrom. This gear 22 transmits motion to a train of gears 23, 24 and 25, arranged on suitable shafts or arbors, the gears 24 and 25 providing a transmission train for driving a pinion 25 at relatively increased speed. This pinion 25 is mounted on a shaft 26 carrying a propeller 27.

The gear 23 transmits motion to a gear 28 on the shaft of which is fixed a cam disk 29 having peripheral cam notches or recesses 30 at intervals. A pallet lever 31 is pivoted to the frame and has an end portion 32 adapted to normally ride upon the periphery of the disk 29, against which it is held by a spring 33, so that when said end of the lever comes opposite a notch or recess 30 it will be forced thereinto by the spring 33, thereby swinging the lever 31 on its pivotal connection. The opposite end of the lever is formed to provide a tooth or pawl 34 to engage a ratchet wheel 35 on a shaft 36, which shaft may be driven by the motor spring 37 of the alarm action of the clock work mechanism, the arrangement being such that so long as the end 32 of the lever 31 rides upon the periphery of the disk 29 the dog 34 will be held in engagement with a tooth of the ratchet wheel 35, thus holding the shaft 36 from rotation under the action of the spring 37. Fixed to the shaft 36 is a wheel 38 carrying a series of sets of pins 39 arranged to successively engage the finger 20 of the actuating lever 15 in the rotation of said wheel. The rows of pins are arranged at such intervals apart that the certain period, say two minutes, may elapse between each actuation of the bellows through the vibration of the lever 15, a plurality of trip pins being employed to sound the call a number of times at the intervals stated. It will of course be apparent that when a notch of the cam comes opposite the lever 31 the dog or pawl 34 will be retracted allowing the wheel 38 to turn until the end 32 of the lever moves out of the notch, during which period the finger 24 successively rides in contact with three pins of a series, thereby vibrating the lever 15 a corresponding number of times to thrice sound the call. The end 32 of the lever 31 then again rides in contact with the periphery of the cam 29 until the next notch is reached, during which period the pawl 34 is held in engagement with the ratchet wheel 25 and fixes the wheel 38 against rotation, during which period the call remains silent.

It will be evident from the foregoing description that upon swinging the upper section of the body to an open position the clock work mechanism and allied working parts of the associated operating device may be exposed, allowing the clock work mechanism to be conveniently wound and all the parts to be lubricated, cleaned, repaired or replaced whenever required. In practice the bottom 3 is provided with an eye bolt or other connection 40 to which is connected an anchor iron 41, which carries a suitable anchor or weight (not shown) by which the decoy is prevented from drifting away, while allowed to float upon the surface of the body of water. It will be evident that when the decoy is in operation motion will be imparted thereto by the propeller 13, so that the decoy will move in a circumscribed path, and will simulate the motions of the natural fowl moving about upon the surface of the water. While so moving, the call 11 will be sounded at fixed intervals by the operation of the pneumatic mechanism from the gearing, as will be readily understood.

If desired, although their use is preferred, the propeller or call or both may sometimes be dispensed with.

From the foregoing description, taken in connection with the drawings, the construction and mode of operation of my improved decoy will be readily perceived, and it will be evident that the invention provides a decoy device which is not only simple of construction, but reliable and efficient for its intended purpose, and which permits of ready access to its working parts for repairs or other purposes.

I claim:—

1. A decoy comprising a body, a pneumatic call, a bellows mechanism for supplying air to operate the call, a vibrating lever for actuating said mechanism, a wheel having spaced series of pins, embodying a plurality of pins in each series, for vibrating said lever a predetermined number of times at predetermined intervals, means for holding said wheel from motion, a clock work mechanism for actuating the wheel, and means controlled by said clock work mechanism for releasing the wheel at predetermined periods for action.

2. A decoy comprising a hollow body, a pneumatic call, bellows mechanism for sounding the call, a propeller, a shaft carrying said propeller, a clock-work mechanism, means actuated thereby for continuously driving the propeller shaft, and means actuated thereby for intermittently actuating the bellows mechanism.

3. A decoy comprising a body, a pneumatic call, a bellows mechanism for supplying air to operate the call, a vibrating lever for actuating said mechanism, a wheel having spaced series of pins for vibrating said lever a predetermined number of times at predetermined intervals, means for holding said wheel from motion, a clock work mechanism for actuating the wheel, said mechanism including a cam, and a cam actuated by the clock work mechanism for controlling said holding means.

In testimony whereof I affix my signature in presence of two witnesses.

AMOS C. VAUGHAN.

Witnesses:
J. H. BRANELLE,
M. LEONHARD.